United States Patent [19]

Holborow

[11] 4,385,639
[45] May 31, 1983

[54] SELF-CYCLING VALVE
[75] Inventor: Peter A. Holborow, Hopatcong, N.J.
[73] Assignee: Automatic Switch Company., New Jersey
[21] Appl. No.: 214,354
[22] Filed: Dec. 8, 1980
[51] Int. Cl.³ ............................................ G05D 16/10
[52] U.S. Cl. ............................. 137/106; 137/596.15; 137/624.14; 251/297
[58] Field of Search ........... 251/297; 137/119, 596.14, 137/596.15, 624.14, 106

[56] References Cited
U.S. PATENT DOCUMENTS

| | | | |
|---|---|---|---|
| 1,920,003 | 7/1933 | Chenault | 137/624.14 |
| 3,051,188 | 8/1962 | Tilney | 137/119 |
| 3,080,887 | 3/1963 | Brandenberg | 137/596.14 |
| 3,614,965 | 10/1971 | Metivier | 137/624.14 |
| 3,996,956 | 12/1976 | Taft | 137/119 |
| 4,029,119 | 6/1977 | Klieves | 137/119 |
| 4,037,617 | 7/1977 | Perales | 137/596.15 |
| 4,285,268 | 8/1981 | Deckler | 137/119 |

Primary Examiner—Martin P. Schwadron
Assistant Examiner—James R. Shay
Attorney, Agent, or Firm—Alan H. Levine

[57] ABSTRACT

A self-cycling valve including a main valve and an operator valve. The main valve comprises a body having an inlet port, an exhaust port, and two outlet ports, and valve elements for controlling communication between each outlet port and the inlet and exhaust ports. The operator valve has a valve member movable between two extreme positions for controlling operation of the valve elements of the main valve. In one extreme position of the valve member, one outlet port of the main valve communications with the inlet port and the other outlet port communicates with exhaust; in the other extreme position of the valve member, the outlet port connections are reversed. The valve member of the operator valve cycles between its extreme positions in response to fluid pressure levels at the outlet ports of the main valve. A spring-biased, pivoting detent urges the operator valve member into each of its extreme positions, the spring force being applied to the detent along a line transverse to the direction of movement of the valve member, so that the biasing force decreases during the movement of the valve member from each extreme position toward its midpoint of travel and increases during movement of the valve member from the midpoint of its travel to the other extreme position. Pistons at opposite ends of the operator valve member respond to fluid pressures at the outlet ports, respectively, for moving the valve member back and forth between its two extreme positions.

4 Claims, 8 Drawing Figures

SELF-CYCLING VALVE

This invention relates to valves, and more particularly to a self-cycling valve for alternately connecting two receivers to a source of high pressure fluid.

An example of an environment in which a valve according to this invention is useful is in an apparatus for producing oxygen. In such an apparatus, a compressor supplies pressurized air to a molecular sieve, or bed, which removes almost all of the nitrogen from the air and delivers oxygen together with a small amount of nitrogen and traces of other gases. In time, the bed becomes exhausted and must be taken out of service and refreshed. Therefore, to provide continuous production of oxygen, it is common to employ two or more separate beds together with numerous individual electrically-operated valves and a bed cycle timer to periodically shift the compressed air from one bed to another.

It happens that as such a bed is used, the resistance to flow of gas through it increases; consequently, the pressure level at the inlet to the bed being used is a measure of how far along it is toward depletion.

It is an object of the present invention to provide a self-cycling valve which when supplied with high pressure fluid alternately shifts the fluid between two outlets from the valve in response to the pressure at the outlet being supplied reaching a predetermined level.

Consequently, the valve of the present invention may be used to replace the individual valves and cycle timer of a conventional oxygen-producing system. Each outlet from the present valve supplies a separate bed. When the pressure in the bed being employed rises to a level indicating that it is near depletion, the valve cycles and switches the other bed into the circuit while cutting out the depleted bed.

It is another object of the invention to provide such a valve wherein a valve member moves between two extreme positions, corresponding to connection of pressurized fluid to one or the other outlet of the valve, the valve member being resiliently biased into each of its extreme positions in such a way that the biasing force tending to hold the valve member in each extreme position diminishes as the valve member moves away from that extreme position.

It is another object of the invention to provide such a valve wherein after the valve member passes its midpoint of travel, the biasing force which tends to hold the valve member in the extreme position toward which it is moving increases as the valve member approaches that extreme position.

Additional objects and features of the invention will be apparent from the following description in which reference is made to the accompanying drawings.

In the drawings:

FIG. 5 is a fragmentary longitudinal cross-sectional view, taken along a plane perpendicular to the plane along which FIGS. 2 and 4 are taken, showing the operator valve member in one of its extreme positions;

Figure 1:
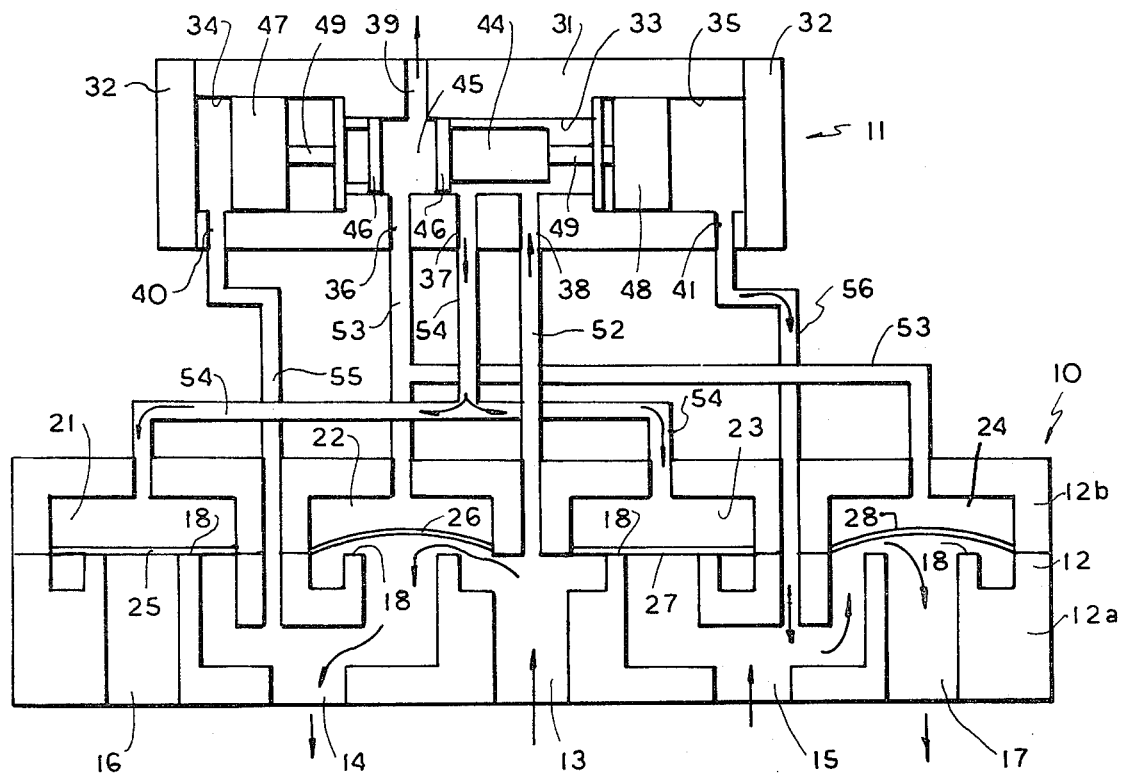
FIG. 1 is a schematic illustration of a self-cycling valve according to the invention, including a main valve and an operator valve, in one condition of operation.

The self-cycling valve chosen to illustrate the present invention includes, as shown in FIG. 1, a main valve 10 and an operator valve 11. For clarity of illustration, valves 10 and 11 are shown separated in FIG. 1 (and FIG. 3); however, in practice, operator valve 11 is mounted directly on main valve 10.

Main valve 10 has a body 12 comprising a lower body portion 12a and a bonnet 12b, the two being joined by suitable fasteners (not shown). Body portion 12a is formed with a high pressure inlet port 13, two outlet ports 14 and 15, and two low pressure exhaust ports 16 and 17. Each of the ports 14-17 communicates with an annular valve seat 18 within body 12.

Bonnet 12b is formed with four chambers 21, 22, 23, and 24. Extending across these chambers are four flexible diaphragms 25, 26, 27, and 28, respectively, the margins of the diaphragms being squeezed between body parts 12a and 12b. Each diaphragm serves as a valve member by cooperating with one of the annular valve seats 18. Thus, when diaphragms 25-28 engage valve seats 18, there will be no fluid flow through ports 16, 14, 15, and 17, respectively; on the other hand, when the diaphragms are lifted off their respective valve seats, fluid flow through those ports can occur.

Operator valve 11 has a body 31 provided at its ends with two caps 32 fastened to the body in fluid tight manner. Within body 31 is a central longitudinal bore 33, and two enlarged end bores, or cylinders, 34 and 35. Body 31 is formed with four ports 36, 37, 38, and 39, communicating with bore 33, a port 40 communicating with cylinder 34, and a port 41 communicating with cylinder 35.

Figure 3:
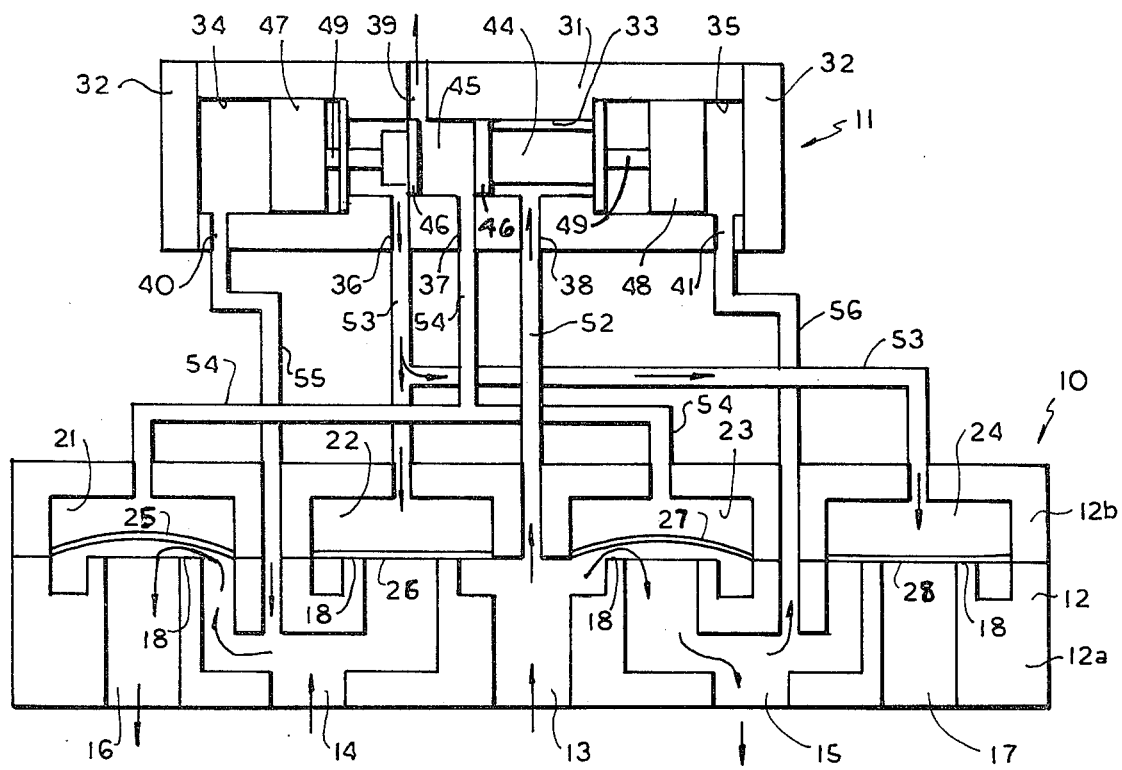
FIG. 3 is a view similar to FIG. 1 showing the self-cycling valve in its alternative condition of operation.

A spool-type valve member 44 is slidably accommodated within bore 33 and is movable between one extreme position, shown in FIG. 1, and another extreme position shown in FIG. 3. Valve member 44 has a transverse through hole 45 bordered on both sides by seals 46 which slidable engage the walls of bore 33 in a fluid-tight manner. In all positions of valve member 44, hole 45 communicates with port 39, which opens to a low pressure region. In one extreme position of valve member 44, hole 45 also communicates with port 36, and in the other extreme position of the valve member, hole 45 communicates with port 37.

Slidable within cylinders 34 and 35 are pistons 47 and 48, respectively. A piston rod 49 connects each piston 47 and 48 with one end of valve member 44.

Port 38 is in continuous communication with inlet port 13 of the main valve, through channel 52. Port 36 communicates with chambers 22 and 24, through channel 53, and port 37 communicates with chambers 21 and 23 through channel 54. The region of cylinder 34 behind piston 47 communicates with outlet port 14 through channel 55, and the region of cylinder 35 behind piston 48 communicates with outlet port 15 through channel 56.

When the valve of this invention is used in an oxygen-producing apparatus of the type mentioned above, inlet port 13 is connected to high pressure air from a compressor (not shown), each outlet port 14 and 15 is connected to a separate bed capable of removing nitrogen from the air, and exhaust ports 16, 17, and 39 are open to the atmosphere. Should this valve be used with a liquid system, ports 16, 17, and 39 would be connected to a low pressure reservoir.

When the valve is in the condition shown in FIG. 1, high pressure air flows from port 13 through channel 52 and port 38 to fill bore 33. The high pressure in bore 33 flows through port 37 and channel 54 into chambers 21 and 23, thereby pressing diaphragms 25 and 27 against their respective valve seats 18. As a result, outlet port 14 is closed to exhaust port 16, and outlet port 15 is closed to inlet port 13. At the same time, chambers 22 and 24 are open to exhaust through channel 53, port 36, hole 45 in valve member 44, and exhaust port 39. As a result, high pressure air at inlet port 13 lifts diaphragm 26 off its seat 18, permitting the compressed air to flow out of outlet port 14 to one of the beds. Diaphragm 28 can also be lifted off its seat 18 to permit communication between the other bed and exhaust through ports 15 and 17. The pressure at outlet port 14 is communicated to cylinder 34 through channel 55, and the low pressure exhaust is communicated to cylinder 35 through channel 56.

When the pressure at outlet port 14 rises to a predetermined level, say 15 p.s.i., this pressure in cylinder 34 urges piston 47 toward the right in FIG. 1, and movement of the piston is transmitted to valve member 44 by piston rod 49. This movement is not resisted by piston 48, since there is exhaust pressure in cylinder 35. Upon completion of the rightward stroke of piston 47, valve member 44 has been moved from its leftwardmost extreme position, shown in FIG. 1, to its rightwardmost extreme position, shown in FIG. 3.

When the valve is in the condition shown in FIG. 3, high pressure air flows from port 13 through channel 52, port 38, bore 33, port 36, and channel 53 to chambers 22 and 24. Diaphragms 26 and 28 are thereby pressed against their respective valve seats 18. As a result, outlet port 14 is now closed to inlet port 13, and outlet port 15 is closed to exhaust port 17. At the same time, chambers 21 and 23 are open to exhaust through channel 54, port 37, hole 45, and exhaust port 39. As a result, high pressure air at inlet port 13 lifts diaphragm 27 off its seat 18, permitting the compressed air to flow out of outlet 15 to the other one of the beds. Diaphragm 25 can also be lifted off its seat 18 to permit communication between the previously used bed and exhaust through ports 14 and 16. When the pressure at outlet port 15 rises to the predetermined value, this pressure in cylinder 35 will act on piston 48 to return valve member 44 to its leftward extreme position (FIG. 1).

Figure 2:
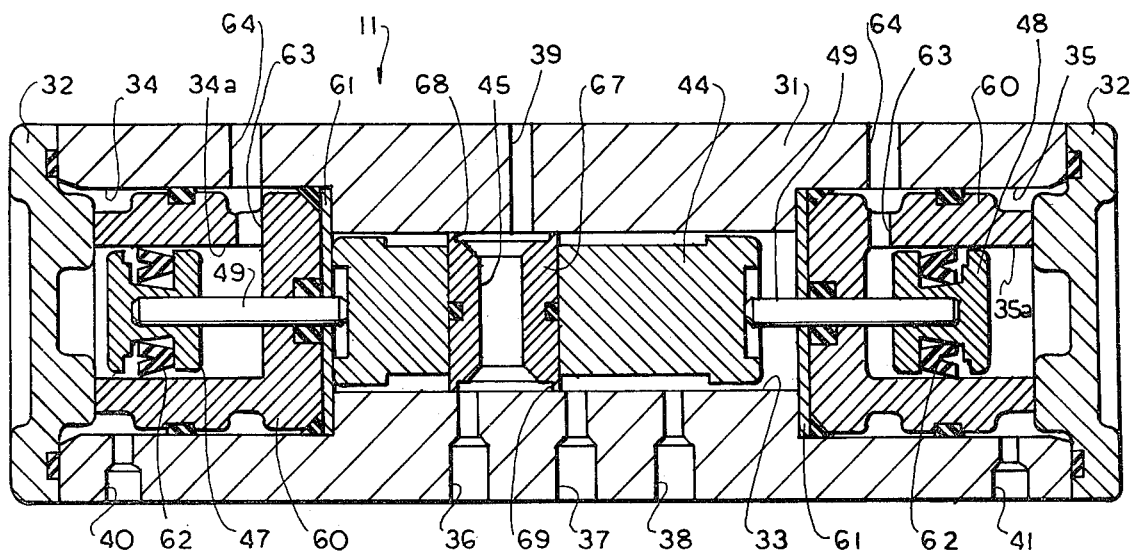
FIG. 2 is a longitudinal cross-sectional view, on an enlarged scale, of the operator valve portion of FIG. 1.
Figure 4:
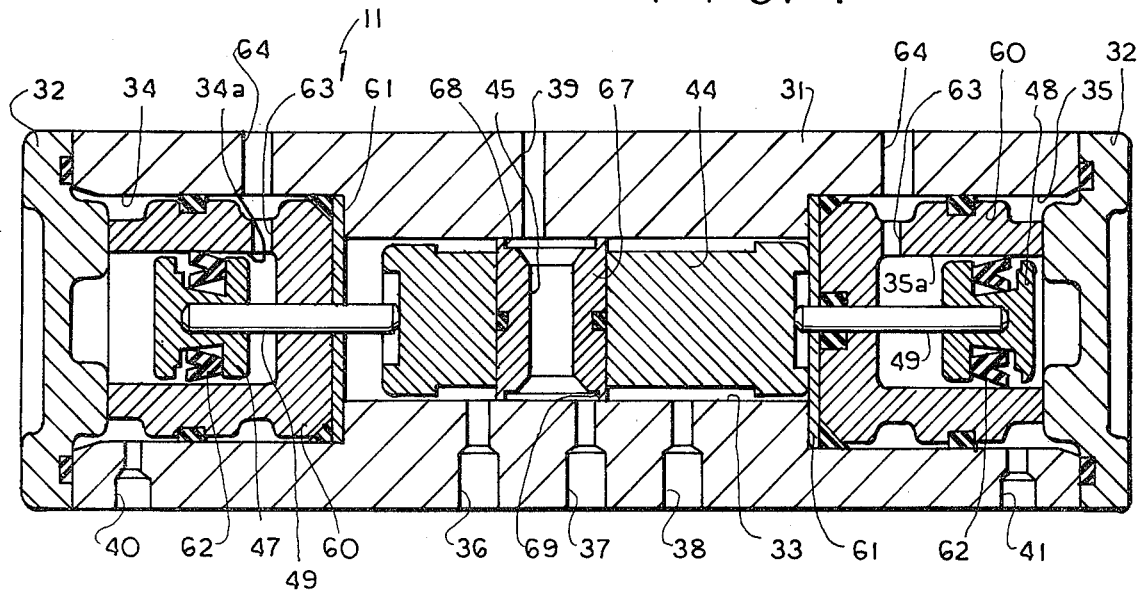
FIG. 4 is a view similar to FIG. 2 of the operator valve portion of FIG. 3.
Figure 5:
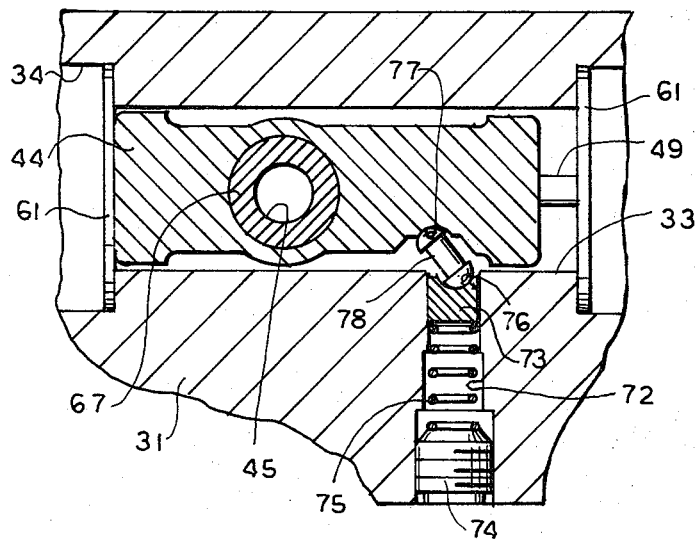
Figure 6:
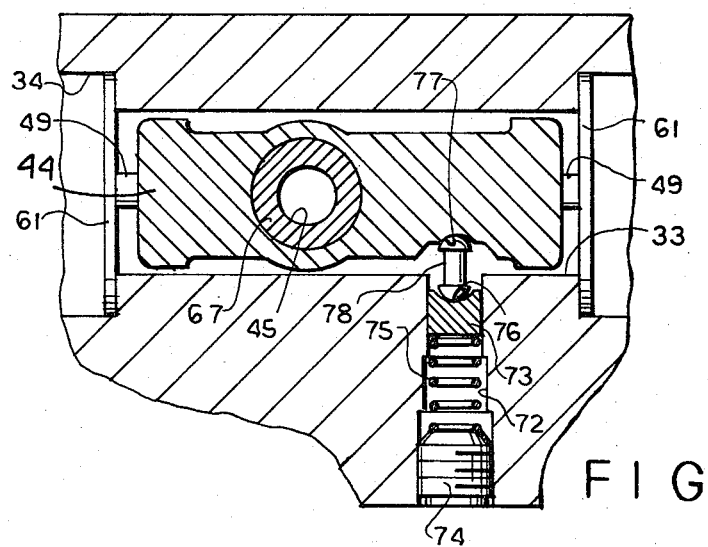
FIGS. 6 and 7 are views similar to FIG. 5 showing the valve member at its midpoint of travel and in its other extreme position, respectively.
Figure 8:
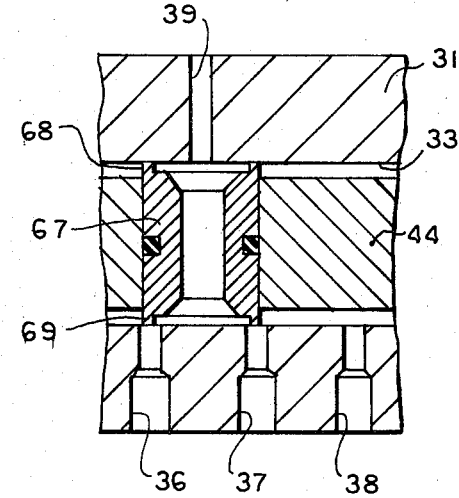
FIG. 8 is a fragmentary cross-sectional view, showing a portion FIG. 2 or 4, when the valve member is at its midpoint of travel.
Figure 7:
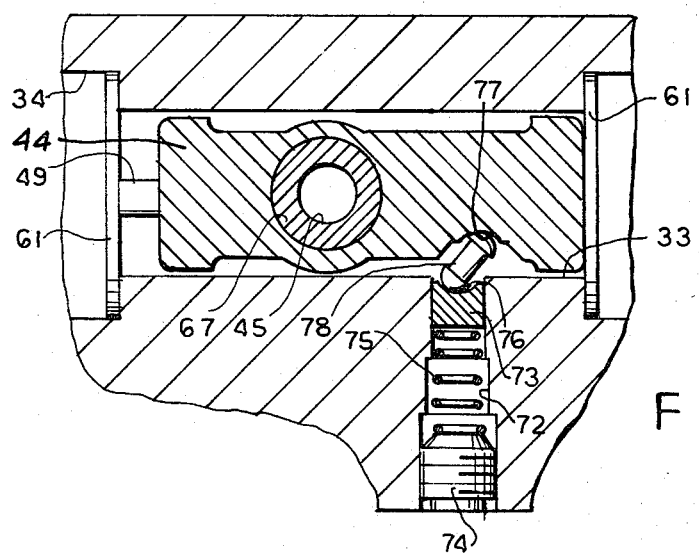

Operator valve 11 will now be described in more detail with reference to FIGS. 2, 4, and 5–8. FIGS. 2 and 5 show valve member 44 in its leftward extreme position, corresponding to the condition of FIG. 1, FIGS. 4 and 7 show valve member 44 in its rightward extreme position, corresponding to the condition of FIG. 3, and FIGS. 6 and 8 show valve member 44 moving through the midpoint of its travel between the two extreme positions.

At each end of central bore 33, in operator valve body 31, is an enlarged bore 34, 35. A fitting 60 is accommodated within each bore 34, 35 in fluid-tight manner, the inner end of the fitting being pressed against a support plate 61, the latter have a hole through which piston rod 49 is slidable in fluid-tight manner. Fitting 60 has an outwardly opening bore 34a, 35a serving as a cylinder for piston 47, 48. Each piston has an annular recess accommodating an annular piston ring 62 having a V-shaped cross-section. Bores 34, 35 and cylinders 34a, 35a are closed in fluid tight manner by end caps 32. The inner face of each end cap is formed with ridges so that ports 40 and 41 communicate not only with bores 34 and 35, respectively, but also with cylinders 34a and 35a, respectively. The inner face of each piston 47, 48 is exposed to low exhaust pressure through hole 63 in fitting 60, and port 64 in body 31. In this way, there is no build-up of pressure at the inner face of piston 47 as it moves toward the right, and there is no build-up of pressure at the inner face of piston 48 as it moves toward the left.

Spool-like valve member 44 has a through hole tightly accomodating a tubular seal 67 having a central hole 45. Seal 67 has ridges 68 and 69 at its ends slidably engaging the wall of bore 33 in fluid-tight manner. When valve member 44 is in its leftwardmost position (FIG. 2) engaging the support plate 61 at that end of bore 33, ridge 68 completely surrounds port 39 and ridge 69 completely surrounds port 36, so that these two ports communicate with each other through hole 45. At the same time, ports 37 and 38 also communicate with each other since the central region of valve member 44 is reduced in diameter. When valve member 44 is in its other extreme position (FIG. 4) engaging support plate 61 at the right end of bore 33, ridge 68 continues to completely surround port 39 and ridge 69 now completely surrounds port 37, so that ports 37 and 39 communicate through hole 45. At the same time, ports 36 and 38 communicate with each other through the space between valve member 44 and the wall of bore 33 (see FIG. 7).

Operator valve body 31 has a transverse bore 72 (FIGS. 5–7) extending between the outer surface of the body and bore 33. Bore 72 slidably accommodates a bearing block 73, at its inner end, and at its outer end, bore 72 is internally threaded and threadably accommodates an externally threaded plug 74. A compression spring 75 seated at one end against block 73 and at its other end against plug 74 constantly urges bearing block 73 inwardly toward bore 33.

The inner face of block 73 is formed with a part-spherical depression or pocket 76, and the opposite surface of valve member 44 is formed with a similarly-shaped pocket 77. A pin-like detent 78 is arranged with one of its semi-spherical ends seated in pocket 76 and the other of its semi-spherical ends seated in pocket 77. While the central pin-like portion of detent 78 may be formed of metal, it is preferrd that bearing block 73 and valve member 44 be made of a low-friction material, such as nylon impregnated with molybdenum disulfide, sold by The Polymer Corporation under the trademark Nylatron.

When valve member 44 is in either of its extreme positions (FIGS. 5 and 7) detent 78 is at an acute angle to the direction of movement of the valve member. Consequently, although spring 75 applies a force to bearing block 73 in a direction transverse (perpendicular in the illustrated embodiment) to the direction of movement of the valve member, a component of that force urges the valve member into whichever extreme position it happens to be in. This force is adjustable, by threading plug 74 more or less into bore 72, thereby adjusting the pressure which must be reached in chamber 34 or 35 to cause movement of the valve member.

As valve member 44 moves away from either of its extreme positions, detent 78 is pivoted toward a position in which it is perpendicular to the direction of movement of the valve member (FIG. 6). Consequently, throughout such movement, the force produced by spring 75 urging the valve member toward the extreme position it had been occupying diminishes as movement of the valve member continues. In other words, when valve member 44 moves from one extreme position to the other, the force on the valve member, in its direction of travel due to spring 75, decreases to zero as the valve member moves through the midpoint of its travel (FIG. 6), and then increases to a maximum in a direction which aids moving the valve member to the extreme position toward which it is traveling.

This is important since, during a midportion of the travel of valve member 44, both ports 36 and 37 communicate with exhaust port 39 through hole 45. Assume that valve member 44 is moving from its extreme position shown in FIG. 1. When ridge 69 moves to and over port 37 (FIG. 8), this port will suddenly be opened to exhaust pressure. As a result, the pressure in channel 54 is reduced, relieving the pressure in chambers 21 and 23. Reduction of pressure in chamber 21 permits diaphragm 25 to lift off its seat 18, thereby reducing the pressure in channel 55 and cylinder 34. When the pressure in cylinder 34 decreases, the force due to this pressure which is moving valve member 44 toward the right decreases. However, this reduction is offset by the reduction in the force of spring 75 tending to resist movement of the valve member toward the right. Reduction of pressure in chamber 23 permits diaphragm 27 to lift off its seat 18, thereby allowing inlet pressure to reach channel 56 and cylinder 35. Such pressure tends to oppose seating of the valve member in its rightward extreme position. However, the increasing spring force applied to the valve member, through detent 78, drives the valve member to its extreme position against support plate 61. Detent 78 functions in the same way as valve member 44 moves from its rightward position to its leftward position. The movement of valve member 44 in either direction does not become arrested at its midpoint of travel (FIGS. 6 and 8) since its inertia carries it past the midpoint after which detent 78 and spring 75 insure movement of the valve member to its extreme position.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A self-cycling valve including a main valve and an operator valve, the main valve comprising:
(a) a main valve body having fluid pressure inlet and exhaust ports and first and second outlet ports, and
(b) main valve means within the body for controlling communication between each outlet port and the inlet and exhaust ports, and the operator valve comprising:
(c) an operator valve body, the interior of the body communicating with the fluid pressure inlet port and with the main valve means in the main valve body,
(d) a valve member movable within the operator valve body, between first and second extreme positions, for controlling operation of the main valve means, the first and second outlet ports communicating with the inlet and exhaust ports, respectively, when the operator valve member is in its first extreme position and the first and second outlet ports communicating with the exhaust and inlet ports, respectively, when the operator valve member is in its second extreme position,
(e) means responsive to an increase in pressure above a predetermined value at the first outlet port for moving the operator valve member from its first extreme position to its second extreme position, and means responsive to an increase in pressure above a predetermined value at the second outlet port for moving the operator valve member from its second extreme position to its first extreme position, and
(f) means for resiliently biasing the operator valve member into each of its extreme pistons, said resilient biasing means including a detent pivotally arranged with respect to the operator valve member and resilient means biasing the detent along a line of force transverse to the direction of movement of the operator valve member, the detent being arranged at an acute angle to the direction of movement of the operator valve member when that member is in either of its extreme positions, and the detent moving through a position in which it is perpendicular to the direction of movement of the operator valve member as the latter moves from each of its extreme positions to the other, whereby the force of the biasing means tending to hold the operator valve member in each of its extreme positions decreases during the movement of the operator valve member from that extreme position to the midpoint of its travel and increases during the movement of the operator valve member from the midpoint of its travel to the other extreme position.

2. A self-cycling valve as defined in claim 1 wherein the detent is a pin rounded at both ends, the operator valve member having a pocket slidably accommodating one end of the detent, and a bearing block having a pocket slidably accommodating the other end of the pin, the resilient means urging the bearing block toward the operator valve member.

3. A valve comprising:
a valve body,
a valve member movable within the body between two extreme positions for controlling fluid flow through the valve body, and
means for resiliently biasing the operator valve member into each of its extreme positions, said resilient biasing means including a detent pivotally arranged with respect to the valve member and resilient means biasing the detent along a line of force transverse to the direction of movement of the valve member, the detent being arranged at an acute angle to the direction of movement of the valve member when that member is in either of its extreme positions, and the detent moving through a position in which it is perpendicular to the direction of movement of the valve member as the latter moves from each of its extreme positions to the other,
whereby the force of the biasing means tending to hold the valve member in each of its extreme positions decreases during the movement of the valve member from that extreme position to the midpoint of its travel and increases during the movement of the valve member from the midpoint of its travel to the other extreme position.

4. A valve as defined in claim 3 wherein the detent is a pin rounded at both ends, the valve member having a pocket slidably accommodating one end of the detent, and a bearing block having a pocket slidably accommodating the other end of the pin, the resilient means urging the bearing block toward the valve member.

* * * * *